US011120826B1

(12) United States Patent
Johnson et al.

(10) Patent No.: US 11,120,826 B1
(45) Date of Patent: Sep. 14, 2021

(54) DIGITAL STORAGE SYSTEM THAT INCLUDES SENSOR AND CIRCUIT TO DETERMINE CONTACT AND/OR DISTANCE BETWEEN READ/WRITE HEAD AND DATA STORAGE MEDIUM

(71) Applicant: Seagate Technology LLC, Fremont, CA (US)

(72) Inventors: Michael Thomas Johnson, Minneapolis, MN (US); Peng Peng, Eden Prairie, MN (US); Declan Macken, Eden Prairie, MN (US)

(73) Assignee: Seagate Technology LLC, Fremont, CA (US)

( * ) Notice: Subject to any disclaimer, the term of this patent is extended or adjusted under 35 U.S.C. 154(b) by 0 days.

(21) Appl. No.: 17/087,065

(22) Filed: Nov. 2, 2020

(51) Int. Cl.
*G11B 5/60* (2006.01)

(52) U.S. Cl.
CPC .......... *G11B 5/6082* (2013.01); *G11B 5/6017* (2013.01); *G11B 5/6029* (2013.01); *G11B 5/6094* (2013.01)

(58) Field of Classification Search
None
See application file for complete search history.

(56) References Cited

U.S. PATENT DOCUMENTS

| 4,669,011 | A | * | 5/1987 | Lemke | G11B 5/6005 360/294.7 |
|---|---|---|---|---|---|
| 7,394,611 | B1 | | 7/2008 | Rahgozar | |
| 7,729,079 | B1 | | 6/2010 | Huber | |
| 8,611,035 | B1 | | 12/2013 | Bajikar et al. | |
| 8,837,070 | B1 | * | 9/2014 | Johnson | G11B 5/6017 360/55 |
| 2007/0253090 | A1 | * | 11/2007 | Hirano | G11B 5/6017 360/75 |
| 2008/0158715 | A1 | * | 7/2008 | Hirano | G11B 5/6035 360/75 |

OTHER PUBLICATIONS

Thornton et al., "A Novel HDD "Component-Level" Operational-Shock Measurement Method", IEEE Transactions on Magnetics, vol. 43, No. 6, pp. 2316-2318, 2007, (3 pages).

* cited by examiner

*Primary Examiner* — William J Klimowicz
(74) *Attorney, Agent, or Firm* — Kagan Binder, PLLC

(57) ABSTRACT

The present disclosure includes systems and methods for using a comparator-based, relaxation oscillator circuit to detect capacitance of a capacitor formed between a metallic feature in a read/write head and a metallic feature in a storage medium.

20 Claims, 7 Drawing Sheets

DIGITAL STORAGE SYSTEM THAT INCLUDES SENSOR AND CIRCUIT TO DETERMINE CONTACT AND/OR DISTANCE BETWEEN READ/WRITE HEAD AND DATA STORAGE MEDIUM

BACKGROUND

The present disclosure relates to detecting capacitance of a capacitor formed between a read/write head and a storage medium.

SUMMARY

The present disclosure includes embodiments of a digital storage system, including:

a storage medium having a major surface, wherein the storage medium includes at least a first metallic feature;

a read/write head having a major surface facing the major surface of the storage medium, wherein the read/write head includes at least a second metallic feature, and wherein the digital storage system is configured to actuate the major surface of the read/write head toward and away from the major surface of the storage medium, and wherein the first metallic feature is electrically coupled to the second metallic feature to form a capacitor; and a comparator-based, relaxation oscillator circuit electrically coupled to the capacitor, wherein the comparator-based, relaxation oscillator circuit is configured to produce a periodic signal output that correlates to a capacitance between the first metallic feature of the storage medium and the second metallic feature of the read/write head.

The present disclosure also includes embodiments of a method of detecting a capacitance of a capacitor formed between a read/write head and a storage medium, wherein the method includes:

providing a capacitor formed between the read/write head and the storage medium, wherein the capacitor is electrically coupled to a comparator-based, relaxation oscillator circuit; and applying a voltage to the comparator-based, relaxation oscillator circuit to produce a periodic signal output that correlates to a capacitance of the capacitor.

DETAILED DESCRIPTION

Figure 1:
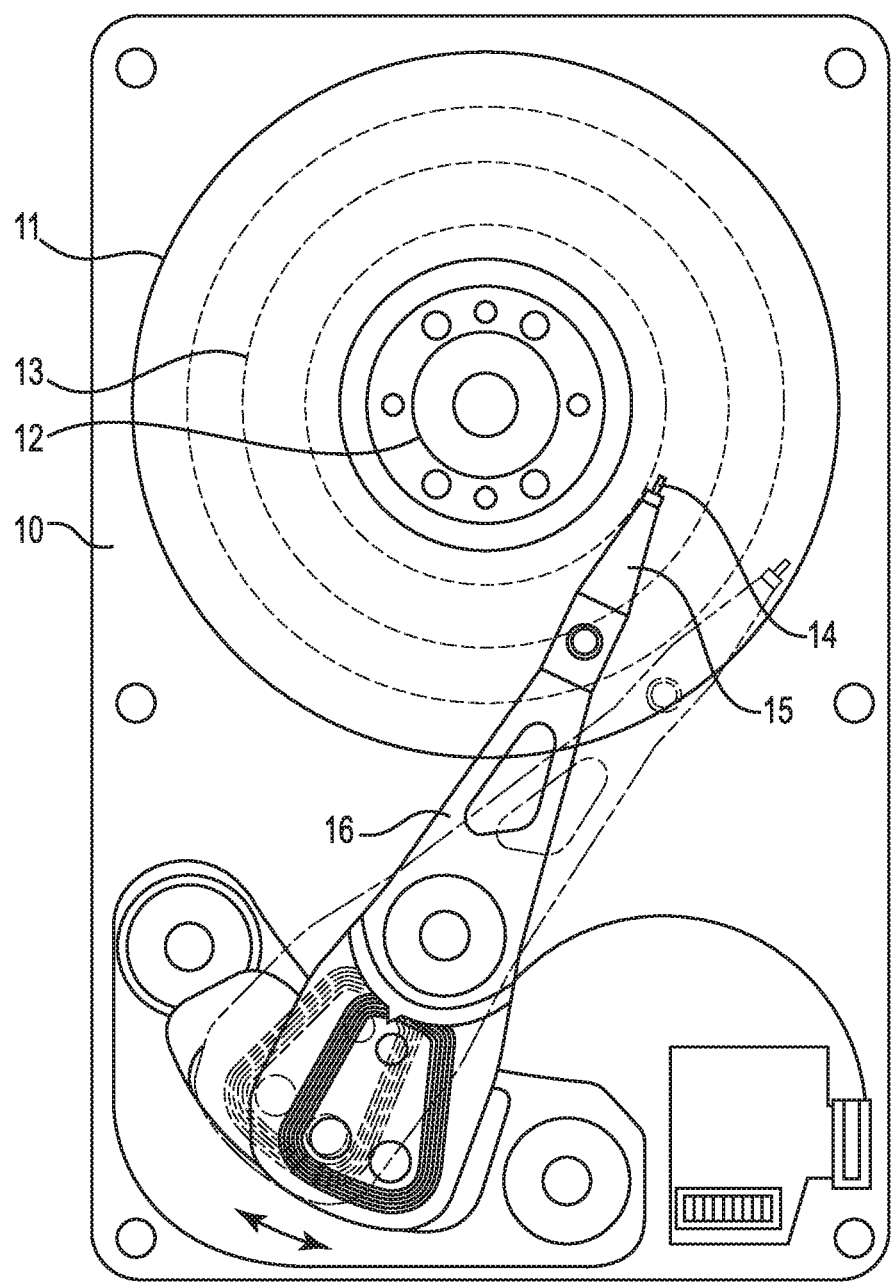
FIG. 1 shows a top view of a hard disk drive with the cover removed.

An example of a digital storage system according to the present disclosure is shown as apparatus 10 in FIG. 1. The magnetic recording apparatus 10 can be referred to as a hard disk drive (HDD) and includes a slider 14 that flies above a disk 11 by using air as a lubricant. Referring to FIG. 1, a disk 11 is placed on a spindle motor 12 that can rotate and a negative pressure air-lubricated bearing slider 14 is attached at a suspension 15 to correspond to the magnetic disk 11. The negative pressure air-lubricated bearing slider 14 can be moved (as indicated by the arrow and dashed lines) along the radius of disk 11 by an actuator arm 16 which pivots so that the slider 14 moves to a desired position on a track 13 of the disk 11. As shown, the disk 11 used as a recording medium has a circular shape and different information can be recorded on each track 13. In general, to obtain desired information, the slider 14 moves in search of a corresponding track on the disk 11.

Figure 2:
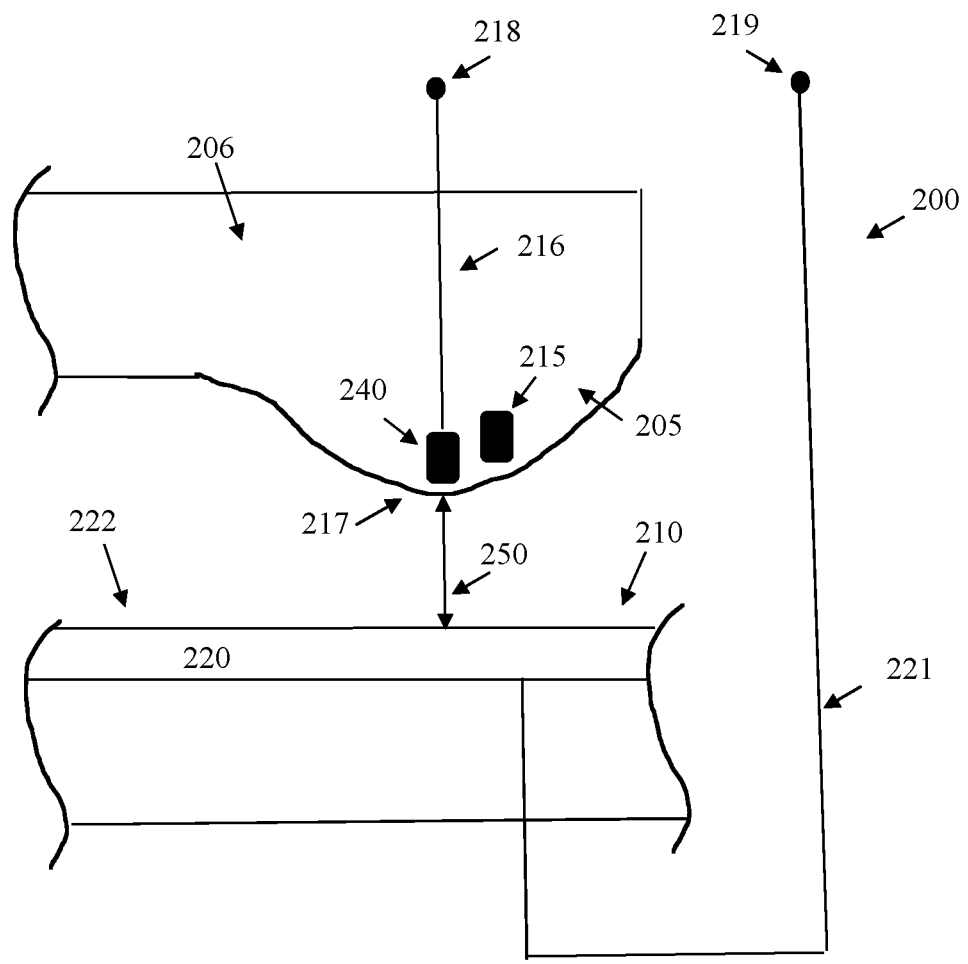
FIG. 2 illustrates a capacitor formed at the interface between a metallic feature in a read/write head and a metallic feature in a disk.

FIG. 2 is a schematic showing a slider 206 that could be used as a slider like slider 14 in FIG. 1, and that incorporates a capacitor 200 according to the present disclosure. Referring to FIG. 2, the clearance 250 between the read/write head 205 of slider 206 and disk 210 is relevant to disk drive performance and/or reliability. Setting the clearance 250 can involve determining a zero reference by actuating read/write head 205 so that it moves into contact with the disk 210. Determining a zero reference can be influenced by one or more factors and, in some cases, to an undue degree. For example, contamination (smear) on the portion of a read/write head facing a disk may cause an early contact detection trigger and thus provide an inaccurate zero reference for clearance setting. Also, changes in contamination at the interface between a read/write head and disk can impact the response of a sensor such as a thermal sensor and trigger premature contact detection. As another example, changes in air bearing pressure can make the quality of contact detection vary in manner such that there can be air bearing design differences along the radius of a disk from the outside diameter (OD) of the disk to the inside diameter (ID) of the disk. For thermal contact sensors, the quality of a contact signal can also be degraded by external signals from one or more heat sources in a read/write head such as heat actuators (for actuating read/write head toward a disk), write coils, and/or lasers, which can be used for heat assisted magnetic recording.

It is desired to have a sensing system that can be used to sense the contact between a read/write head and an underlying, rotating disk, which can be used to determine a zero reference and/or distance between the read/write head and the disk. It is also desirable to have a sensing system that is relatively less sensitive, or not sensitive at all, to one or more of the factors such as "noise" described herein that can negatively impact the repeatability and/or quality of contact detection between the read/write head and disk.

The present disclosure includes a sensing system that includes at least one capacitive contact detecting sensor that senses the electrical capacitance produced by a capacitor formed between one or more metallic features in a read/write head and one or more metallic features in a disk. The electrical capacitance can then be used to determine the distance (or clearance) 250 between the read/write head 205 of slider 206 and the underlying, rotating disk 210. This is described in detail below with respect to FIGS. 2 and 3.

The capacitor 200 in FIG. 2 includes at least one metallic feature in storage medium (disk 210) at least one metallic feature in the read/write head 205 of slider 206. As described below, the capacitance between the metallic feature in the storage medium and the metallic feature in the read/write head can be used to determine the clearance 250 and/or contact between the read/write head 205 of slider 206 and disk 210.

The capacitance at the interface between the read/write head 205 and the disk 210 changes as the read/write head 205 is actuated toward (e.g., until the read/write head 205 makes physical contact with the disk 210) or away from the disk 210. These changes in capacitance can be used to detect when the read/write head 205 makes contact with the disk 210 as well changes in clearance (distance between a read/write head 205 and an underlying disk 210) before contact.

A capacitor includes two or more parallel conductive (metallic) surfaces that are electrically separated by an insulating material such as air and that is commonly referred to as a dielectric. A DC current cannot flow through a capacitor because of the insulating layer. Instead, a voltage is present across the metallic features separated by a dielectric in the form of an electrical charge. As shown in FIG. 2, air is between read/write head 205 and disk 210.

When used in a direct current or "DC" circuit, the capacitor can charge up, for example, to its supply voltage. When a DC voltage is placed across a capacitor, the positive (+v) charge accumulates on one metallic feature while a corresponding and opposite negative (−v) charge accumulates on the other metallic feature. This is because electrons flow from a negative terminal to a positive terminal of a circuit, and current flows in the opposite direction.

The flow of electrons onto the metallic features can be referred to as the charging current, which continues to flow until the voltage across the metallic features is equal to a voltage such as the applied voltage "Vc." At this point the capacitor is considered to be fully charged.

The rate of charging and discharging in a comparator-based, relaxation oscillator circuit, discussed below, can vary. As one nonlimiting example, in some embodiments, the rate of charging current is higher when the metallic features are fully discharged and slowly reduces in value to zero as the metallic features charge up to a potential difference across the metallic features equal to threshold voltage such as the source voltage. As another nonlimiting example, in some embodiments, the rate of charging and discharging of a capacitor occurs at a constant rate such as in a triangle oscillator.

The property of a capacitor to store charge on its plates in the form of an electrostatic field is referred to as the "capacitance" of the capacitor. A capacitor formed between parallel opposing surfaces of two metallic features that are at a distance from each other and separated by a dielectric has a capacitance, reported in Farads (e.g., picoFarads). The capacitance is fixed by the surface area of a first metallic feature surface and the surface area of a second metallic feature surface that is facing the surface of the first metallic feature, and the distance of separation between them. Altering, for example, the distance between the metallic features alters the value of the capacitor's capacitance. For example, as the distance between two metallic features as described herein decreases the capacitance of the capacitor formed by those two metallic features increases.

A metallic feature used to construct one half of the sensing capacitor according to the present disclosure can be a dedicated metallic feature formed specifically to function as a capacitor "plate" or may be an existing metallic feature that has one or more additional functions.

A dedicated conductive metallic feature can have a variety of cross-sectional shapes such as square, circular, rectangular and the like. Also, a dedicated conductive metallic feature can be any desired three-dimensional shape such as a cylindrical shape, a spherical shape and the like.

A metallic feature in or on a disk has a surface that faces an opposing surface of a metallic feature in or on the read/write head so as to form a capacitor. A metallic feature in or on a read/write head 205 is generically represented in FIG. 2 as 215. A metallic feature is positioned on or in a read/write head 205 so that it can form a capacitor with a corresponding metallic feature in the disk. Any metallic feature near the expected contact point between the read/write head and the disk can be used. A metallic feature may be exposed to the surface of the slider or recessed from the surface. In some embodiments, the surface metallic feature that will oppose surface in the disk to form a capacitor is exposed at the air bearing surface prior to carbon overcoating. Nonlimiting examples include one or more metallic devices that are also used for another purpose during drive operation such as a return pole of a writer, a reader shield, a contact pad, and the like.

The space between the metallic features that form a capacitor as described herein can include a variety of materials. Nonlimiting examples include one or more carbon coatings; one or more adhesion layers; one or more lubricant coatings on the disk. Also, the spacing between a read/write head and a disk solid can include a gas medium within the hard disk drive such as air, helium or a blended gas mixture thereof. In general, the opposing surfaces of the metallic features may not be coplanar. For example, a disk tends to be flat to a first order but the read/write head surface can be topographic due to mixed material sets and evolve a different profile centered on a desired close point under actuation.

A metallic feature in or on a disk 210 is generically represented in FIG. 2 as 220. A metallic feature is positioned on or in a disk 210 so that it can form a capacitor with a corresponding metallic feature in the read/write head. Nonlimiting examples include one or more layers of metallic, magnetic material such as magnetic recording layer (e.g., cobalt-based alloy) in a hard disk used to store bits of data.

As shown in FIG. 2, read/write head 205 has a major surface 217 facing a major surface 222 of the storage medium 210. The metallic feature 215 is positioned on or in read/write head 205 so that it has a surface that faces an opposing surface of the metallic feature 220 in or on the disk 210 and is separated by a distance 250 by air to form a capacitor 200 when the major surface 217 faces major surface 222. The capacitance of capacitor 200 can change as the distance 250 changes. For example, the read/write head 205 is configured to actuate toward and away from the disk 210 to change the distance 250. The major surface 217 of read/write head 205 can actuate via a variety of techniques. For example, a read/write head 205 may include a heater device generically represented in read/write head 205 as 240 that can heat the read/write head 205 in a manner that causes at least a portion of the read/write head 205 to expand so that surface 217 (and metallic feature 215) move toward major surface 222 (and metallic feature 220) of disk 210. Adjusting the heat output of such a heater device can actuate the read/write head 205 toward and away from disk 210 as desired. For example, when heater device 240 is off the read/write head 205 may have a "fly height" 250 of about 10 nanometers above disk 210. When heater device is turned on for "read/write" operations, the fly height 250 of read/write head 205 above disk 210 may be about 1 to 2 nanometers.

As shown in FIG. 2, metallic feature 215 is coupled to electrical line 216 and metallic feature 220 is coupled to electrical line 221 so that metallic feature 215 and metallic feature 220 are in electrical communication with a circuit to form a sensing system using capacitor 200. Also, FIG. 2 shows capacitor 200 terminals 218 and 219 which can be connected to an oscillator circuit and charged and discharged to create the period of the oscillator circuit. For illustration purposes, with respect to the example oscillator circuit shown in FIG. 3, this capacitance is represented by capacitor 301 that is connected from the inverting comparator input 312 to ground.

Examples of using capacitance sensing in disk drives is reported in U.S. Pat. No. 7,729,079 (Huber), U.S. Pat. No. 7,394,611 (Rahgozar) and U.S. Pat. No. 8,611,035 (Bajikar et al.), wherein the entirety of each patent is incorporated herein by reference.

According to the present disclosure, a comparator-based, relaxation oscillator circuit is electrically coupled to a capacitor formed between at least one metallic feature in a read/write head and at least one metallic feature in a disk (e.g., capacitor 200) to determine the capacitance of the capacitor, which can be used to determine contact ("zero-reference") and/or the distance between the read-write head and the rotating, underlying disk. A comparator-based, relaxation oscillator circuit according to the present disclosure is configured to produce a periodic signal output that correlates to a capacitance between a metallic feature in the read/write head and a metallic feature in the storage medium (e.g., disk). The oscillator circuit is electrically coupled to the capacitor formed by the read/write head and data storage medium, and is operable to calculate the capacitance using the periodic signal output.

The period or frequency of the oscillator circuit is dependent on the capacitance of the interface between a metallic feature in the read/write head and a metallic feature in the disk. The period of the oscillator circuit is related to the charging time constant (RC) of the capacitance of the interface by the following equation:

$$T \propto RC = \frac{T_m}{N},$$

where T is the oscillator circuit period output that is produced; RC is the charging time constant of the interface between the metallic feature in the read/write head and the metallic feature in the disk; Tm is the measurement time, and N is the number of cycles of the oscillator circuit counted in time Tm.

As can be seen, the signal output of an oscillator circuit is the period (or frequency), which can be correlated to the RC time constant. Changes in the measured metrics (N, Tm, and/or T) can be used to detect changes in capacitance and, therefore, contact between the read/write head and the disk surface and/or clearance changes between the read/write head and the disk surface. It is noted that a change in clearance (e.g., distance 250 in FIG. 2) between the read/write head and the disk surface could be caused any desirable technique, especially a technique that permits localized actuation centered on the read transducer during read and the write transducer during write. Nonlimiting examples of actuating the head toward and away from a disk include one or more of motion of an actuator arm, heater device actuator, changes in ambient conditions within a data storage device, or other sources.

Figure 3:
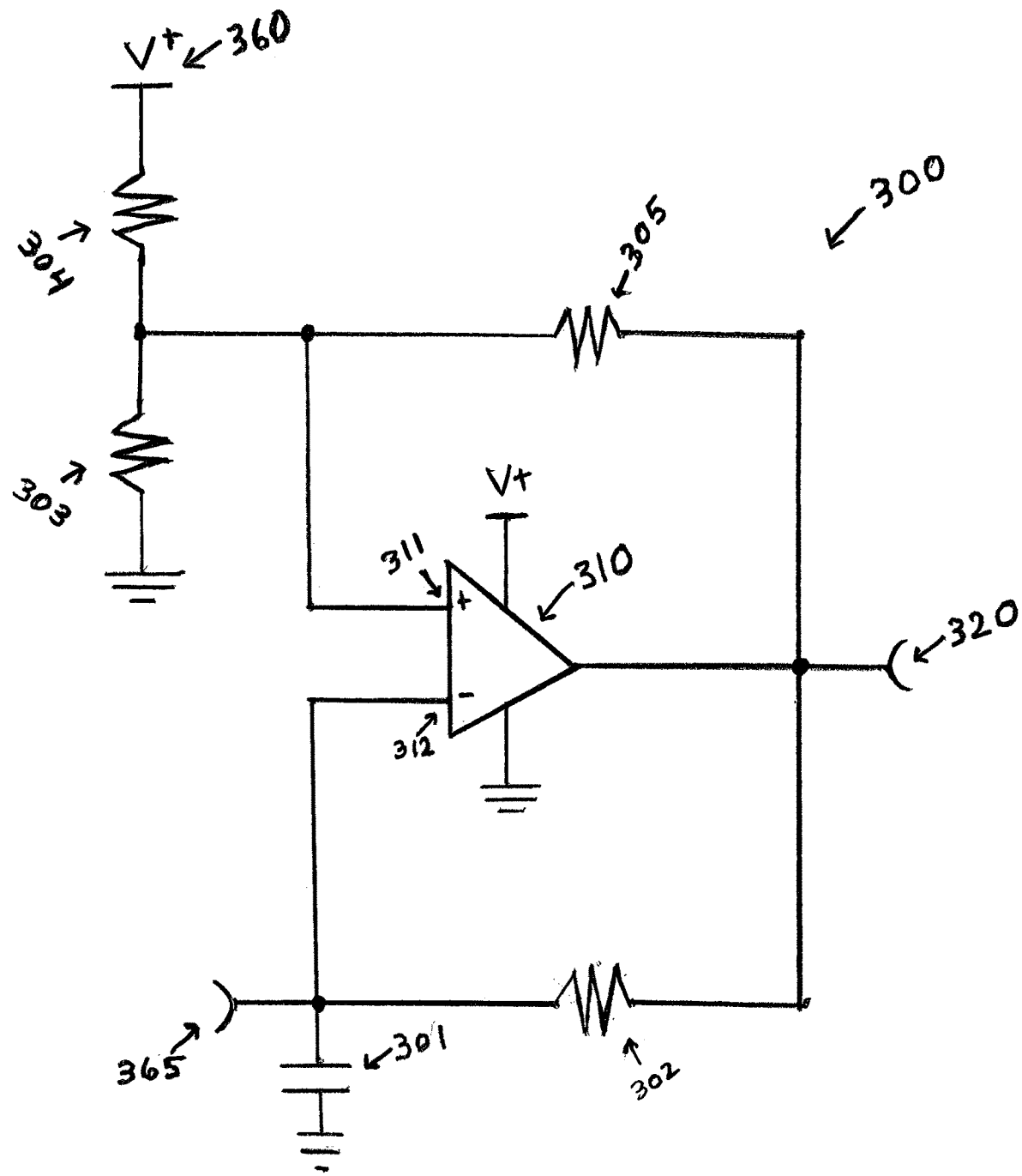
FIG. 3 illustrates an example of a comparator-based, relaxation oscillator circuit configured to produce a periodic signal output that correlates to a capacitance between a metallic feature in a read/write head and a metallic feature in a disk as shown in FIG. 2.

A non-limiting example of a comparator-based, relaxation oscillator circuit that can be used to measure the capacitance of a capacitor according to the present disclosure is shown in FIG. 3.

The comparator-based, relaxation oscillator circuit 300 can generate a wave such as square wave for a given frequency, which is performed by charging and discharging the capacitor 301 through the resistor 302. As shown in the formula above, the oscillation frequency (or period) is directly proportional to and determined by the RC time constant of capacitor 301 and resistor 302, and the threshold levels (upper and lower trip points of voltage 365 across capacitor 301) are set by a resistor network. For illustration purposes, a resistor network is shown in FIG. 3 as including resistors 303, 304 and 305. Capacitor 301 corresponds to the capacitor 200 shown in FIG. 2, which corresponds to the capacitor formed by metallic feature 215 and metallic feature 220. The maximum frequency of the oscillator circuit 300 is limited by the toggle rate of the comparator 310 and the capacitance load at the output.

The actual value of the nominal capacitance can vary and depends on the design of the head and can include parasitic capacitances due to the electrical circuit. The capacitance due to metallic features 215 and 220 can be selected to be much higher than parasitic capacitance to reduce any impact of parasitic capacitance.

During operation of oscillator circuit 300, the voltage 365 across the capacitor 301 is initially at zero when power is not applied to the oscillator circuit 300. When the power is turned on, capacitance voltage 365 is present across the capacitor 301 starts charging through the resistor 302 and the output voltage 320 of the comparator 310 will be high (+V). A fraction of this high voltage is fed back to the non-inverting pin 311 of the comparator 310 by the resistor network of resistors 303, 304 and 305. When the voltage across the charging capacitor 301 is increased to an upper trip point and when the voltage at the inverting pin 312 is higher than the non-inverting pin 311, then the output 320 of the comparator 310 changes to bring the output 320 back down. The upper trip point for comparator 310 can be set via the resistor network 303, 304 and 305 to be less than the supply voltage 360. The capacitor rapidly discharges through resistor 302 while a fraction of the output 320 is fed back to the non-inverting pin 311 by the feedback network of resistors 303, 304 and 305. When the output voltage 320 is below the lower trip point such that the voltage at the inverting pin 312 is less than the voltage at the non-inverting pin 311, the output 320 of the comparator 310 changes so that capacitor 301 starts charging again. This cycle is repeated over time and the result is a square wave oscillating between the high and low trip points at the output 320 of the comparator 310. Notably, the RC time constant defined by capacitor 301 and resistor 302 causes the circuit 300 to oscillate automatically, which can be simple and convenient from a manufacturing and/or operation perspective.

Figure 4:
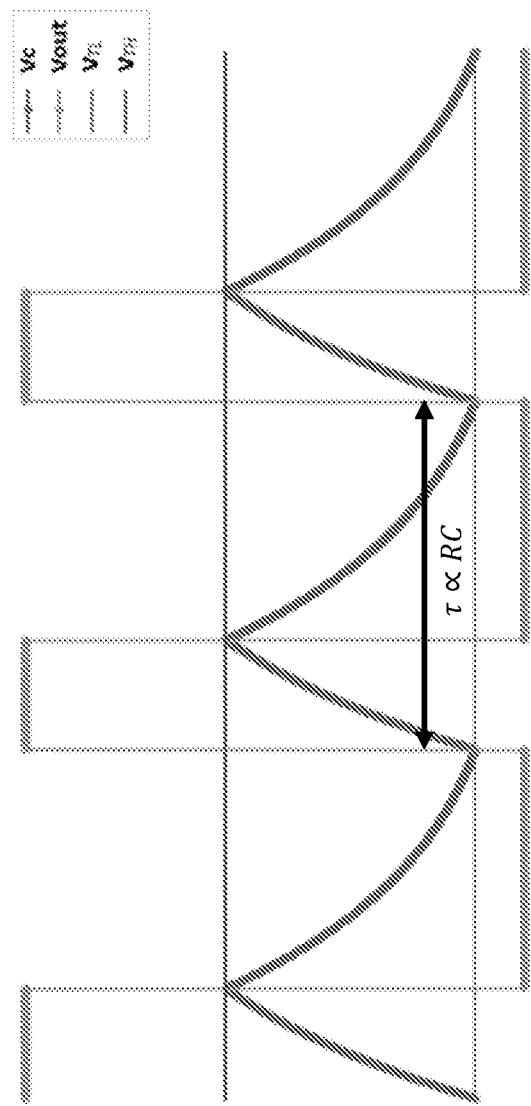
FIG. 4 shows a diagram of the oscillator output voltage and capacitance voltage versus time for the circuit shown in FIG. 3.

Operation of circuit 300 is described with reference to FIG. 4, which shows a diagram of the oscillator output voltage 320 and capacitance voltage 365 versus time for the circuit 300 shown in FIG. 3. The output voltage "Vout" and the capacitance voltage "Vc" in FIG. 4 correspond to 320 and 365, respectively, in FIG. 3. As can be seen, the output voltage Vout is a square wave and the capacitance voltage Vc is the voltage produced by charging and discharging capacitor 301 at a rate determined by resistor 302. As shown in FIG. 4, the capacitance voltage Vc oscillates between the lower threshold "$V_{TL}$" and upper threshold "$V_{TH}$". The lower threshold $V_{TL}$ and upper threshold $V_{TH}$ are set by one or more resistors such as resistors 303, 304 and 305.

The value of the resistor used to charge the capacitor is adjusted to charge the capacitance at the desired rate. Although the value may be any value that is appropriate to set the desired frequency, typical values range from 10 Ohms to 100 k Ohms, or even from 100 Ohms to 10 k Ohms for existing head designs.

The output wave of a comparator-based, oscillator circuit design according to the present disclosure can be manipulated to have a variety of shapes. As described with respect to comparator-based, relaxation oscillator circuit 300, the output wave of the output voltage 320 is square-shaped. In some embodiments, the capacitor charging-discharging voltage of a comparator-based, oscillator circuit according to the present disclosure can be manipulated to be one or more different shapes such as triangle waves, saw-tooth waves, or pulse waveforms.

The period of the comparator-based, relaxation oscillator circuit 300 can be determined using one or more techniques such as those well-known in the art. One non-limiting example includes counting the number of cycles of the comparator-based, relaxation oscillator circuit 300, N, in a fixed time, Tm. A change in N (or T calculated from N) indicate clearance changes between the read/write head and the disk surface or contact between the read/write head and the disk surface.

Another non-limiting example includes determining the amount of time, Tm, it takes to achieve a fixed number of cycles, N, for comparator-based, relaxation oscillator circuit 300. Changes in Tm (or in T calculated from Tm) can be used to indicate clearance changes between the read/write head and the disk surface or contact between the read/write head and the disk surface.

Figure 5:
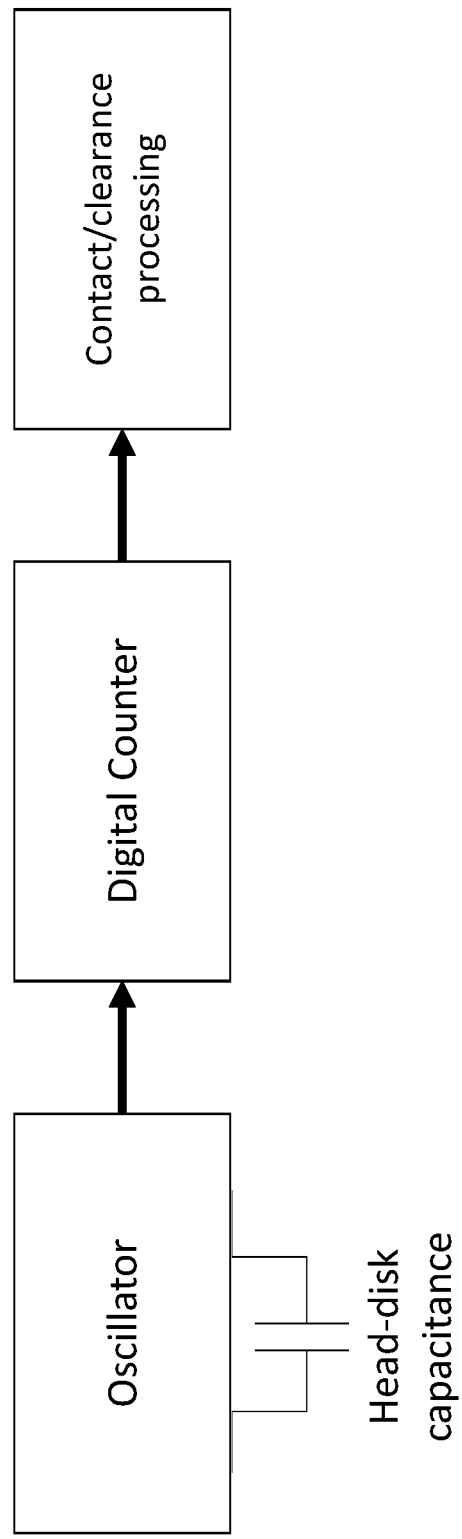
FIG. 5 is a block diagram showing the relationship of using a digital counter with respect to a circuit as shown in FIG. 3.

The number of cycles, N, can be measured using standard digital electronic counting circuitry. Counting the cycles permits a relatively easy and fast manner of obtaining an output that can then be converted into capacitance, which can be directly used to determine contact and/or the distance between the read/write head and disk. FIG. 5 is a block diagram showing the relationship of using a digital counter with respect to a circuit such as 300. Advantageously, processes that measure waveforms and then digitize waveforms via an analog to digital converter can be avoided, if desired.

Figure 6:
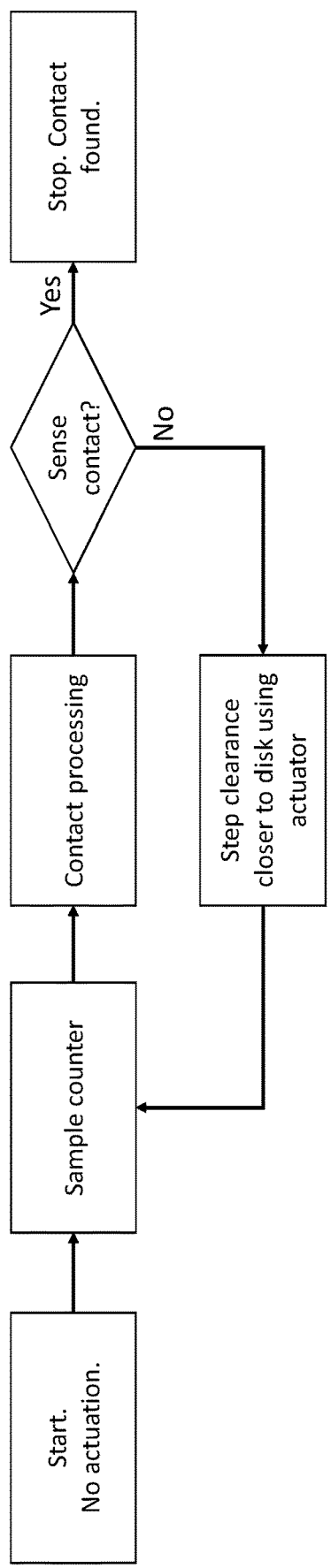
FIG. 6 is a flow chart showing a non-limiting example of an algorithm for determining contact between a read/write head and an underlying rotating disk.

FIG. 6 is a flow chart showing a non-limiting example of an algorithm for incrementally actuating a head closer to a rotating disk using a heater actuator and oscillator output to determine contact between a read/write head and an underlying rotating disk.

In some embodiments, the resolution of the circuit output signal 320 can be improved by increasing the number of cycles used (e.g., to determine contact). This could be done by either increasing the time used for counting or decreasing the period of the comparator-based, relaxation oscillator circuit 300 (e.g., by changing the RC time constant).

Using a capacitor and a comparator-based, relaxation oscillator circuit to determine capacitance as described herein is relatively robust with respect to "noise" such as thermal noise and the like. Advantageously, because the circuit is relatively robust with respect to noise filtering noise can either be avoided or can be performed in a manner that reduces or avoids undue contact time between the read/write head and the disk. For example, if the read/write head contacts and remains in contact with a disk for a period of time while a sensing system filters noise, such contact can tend to wear out a read/write head faster the longer the read/write head remains in contact with the rotating disk.

Although the design targets may vary, an oscillator period of 1 microsecond or 1 kHz frequency or higher (e.g., from 1 kHz to 100 MHz) would allow sufficient resolution using a measurement time of one revolution of a disk or less (<~10 milliseconds) per heater step. This is desirable because using a shorter time measurement reduces the chance of wearing the head during a contact detect.

In some embodiments, a period of a comparator-based, relaxation oscillator circuit according to the present disclosure can be selected from 10 nanoseconds to 20 microseconds, or even from 0.1 to 1 microsecond.

Also, a capacitor and comparator-based, relaxation oscillator circuit according to the present disclosure can be used in combination with a high pressure air bearing design that has low or no modulation when the head is actuated into contact with the disk. Advantageously, a capacitor and comparator-based, relaxation oscillator circuit according to the present disclosure does not rely on a signal produced by high frequency modulation of the capacitance, which is caused by the read/write head shaking due to intermittent contact between the head and disk. Further, high frequency modulation sensing systems tend to rely on one or more flexible components that secure the read/write head such as suspension 15 and/or actuator arm 16 in FIG. 1. Advantageously, a capacitor and comparator-based, relaxation oscillator circuit according to the present disclosure can be used with relatively more rigid components that secure the read/write head such as suspension 15 and/or actuator arm 16 in FIG. 1, which can promote stable fly height.

As yet another advantage, the output voltage such as 320 of a comparator-based, relaxation oscillator circuit tends to be relatively large in the context of sensing capacitance between a read/write head and disk such that amplification can be avoided if desired, thereby simplifying the process of sensing of capacitance even more. In contrast, small currents caused by capacitance modulation sensing techniques can be susceptible to external electrical noise sources such as motors, digital electronics, and other ground noise.

In some embodiments, the capacitance voltage such as 365 of a comparator-based, relaxation oscillator circuit according to the present disclosure can be selected from 100 milliVolts to 1 Volt, or even from 100 to 500 milliVolts depending on the design of the system.

In some embodiments, the output voltage such as 320 of a comparator-based, relaxation oscillator circuit according to the present disclosure can be selected to be 30 Volts or less, such as from 1 to 5 Volts depending on the design of the system.

As discussed above, as the distance between a metallic feature in a read/write head and a metallic feature in an underlying rotating disk that form a capacitor decreases as the capacitance of the capacitor increases. As also discussed above, as the capacitance of the capacitor increases, the period of a comparator-based, relaxation oscillator circuit also increases (or the number of cycles in a given time period decreases).

EXAMPLE

Figure 7:
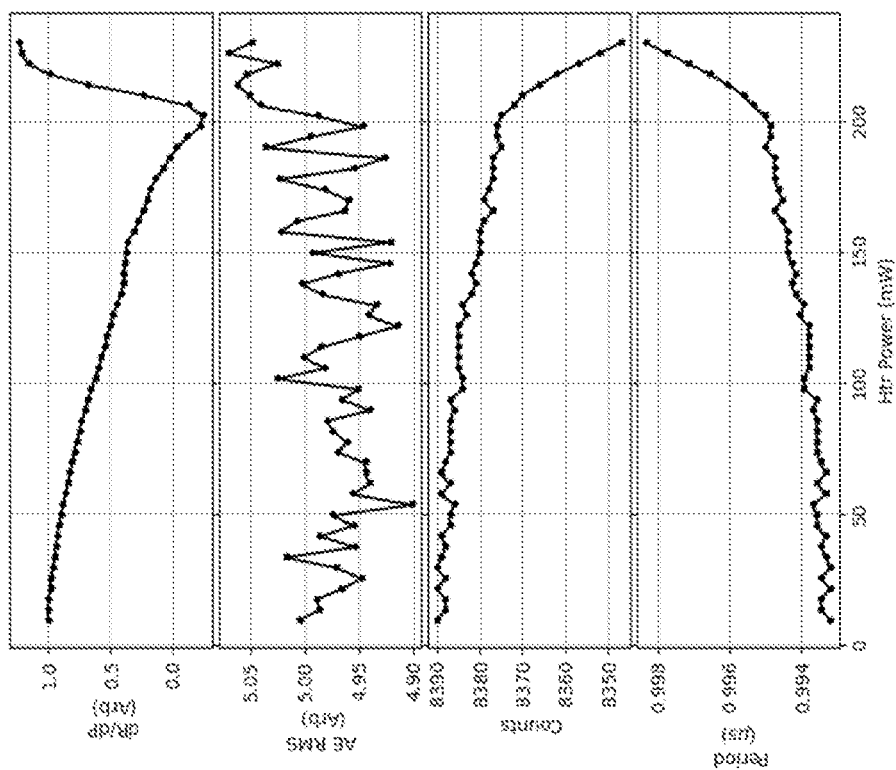
FIG. 7 is a graph of data according to an example.

An example was performed to determine demonstrate sensing contact between a read/write head and a disk using a prototype of a capacitor like capacitor 200 electrically coupled to a comparator-based, relaxation oscillator circuit like circuit 300. Detecting contact between a read/write head and a disk can serve as a reference point of zero for the distance between the read/write head the underlying, rotating disk. The metallic feature in the read/write head of the prototype was the return poles for the writer and the metallic feature in the rotating disk was the magnetic recording layer. The read/write head was actuated toward the disk using a heater device to cause the read/write head to expand toward the disk until contact was made. Measurements were made by holding the measurement time (Tm) fixed and counting the number of cycles (N) of the comparator-based, relaxation oscillator circuit. The number of cycles N was counted using a NI PCIe-6376 data acquisition board although any counter with sufficient response time will work. As shown in FIG. 7, the number of counts decreased (an increase in the period of the oscillator circuit) as the heater power increases and the spacing between the read/write head and disk is reduced. At the onset of contact between the read/write head and disk there was more rapid decrease in the number of counts (an increase in the period of the oscillator circuit).

In comparison, the response from a thermal sensor (arbitrary units) showing the rate in change of resistance of a thermal sensor with heater actuator power (dR/dP) started showing significant changes in measurement likely because of changes in the thermal conductions as the read/write head contacts the disk. Also in comparison, the modulation in the interface as detected by the root-mean-square amplitude (refers to native modulation of the airbearing) of the output of an acoustic emission (AE) sensor (arbitrary units) was relatively much less precise overall, and relatively weak or non-existent.

In some embodiments, a digital storage system according to the present disclosure can also include capacitance measurement circuit electrically coupled to the comparator-based, relaxation oscillator circuit 300 and configured to receive the periodic signal output 320 from the comparator-based, relaxation oscillator circuit to calculate a capacitance between the read/write head 205 and the storage medium 210 or a derivative of the capacitance.

In some embodiments, a digital storage system according to the present disclosure can also include control circuitry operable to convert the periodic signal output 320 into a signal representative of contact between the read/write head 205 and the storage medium 210. In some embodiments, the control circuitry is operable to convert the periodic signal output 320 into an estimate of fly height 250 of the read/write head 205 above the storage medium 210. In some embodiments, the control circuitry is configured to adjust a distance 250 between the read/write head 205 and the storage medium 210 in response to the estimate of fly height 250.

What is claimed is:

1. A digital storage system, comprising:
a storage medium having a major surface, wherein the storage medium comprises at least a first metallic feature;
a read/write head having a major surface facing the major surface of the storage medium, wherein the read/write head comprises at least a second metallic feature, and wherein the digital storage system is configured to actuate the major surface of the read/write head toward and away from the major surface of the storage medium, and wherein the first metallic feature is electrically coupled to the second metallic feature to form a capacitor; and
a comparator-based, relaxation oscillator circuit electrically coupled to the capacitor, wherein the comparator-based, relaxation oscillator circuit is configured to produce a periodic signal output that correlates to a capacitance between the first metallic feature of the storage medium and the second metallic feature of the read/write head.

2. The digital storage system of claim 1, wherein the first metallic feature is a magnetic recording layer in the storage medium.

3. The digital storage system of claim 1, wherein the second metallic feature is chosen from a return pole of a writer, a reader shield, a contact pad, and combinations thereof.

4. The digital storage system of claim 1, wherein the periodic signal output of the comparator-based, relaxation oscillator circuit has a period from 10 nanoseconds to 10 microseconds.

5. The digital storage system of claim 1, wherein the capacitor has a maximum voltage in the range from 100 milliVolts to 1 Volt.

6. The digital storage system of claim 1, wherein the comparator-based, relaxation oscillator circuit comprises:
a first resistive system comprises one or more resistive components, wherein the first resistive system is electrically coupled to the capacitor and a comparator of the comparator-based, relaxation oscillator circuit; and
a second resistive system comprises one or more resistive components, wherein the second resistive system is electrically coupled to a supply voltage and the comparator of the comparator-based, relaxation oscillator circuit.

7. The digital storage system of claim 1, further comprising a capacitance measurement circuit electrically coupled to the comparator-based, relaxation oscillator circuit and configured to receive the periodic signal output from the comparator-based, relaxation oscillator circuit and to calculate a capacitance between the read/write head and the storage medium or a derivative of the capacitance.

8. The digital storage system of claim 1, further comprising control circuitry operable to convert the periodic signal output into a signal representative of contact between the read/write head and the storage medium.

9. The digital storage system of claim 1, further comprising a controller, wherein the read/write head further comprises at least one heater device in electrical communication with the controller, wherein the heater device is operable to actuate the major surface of the read/write head toward the major surface of the storage medium, wherein the controller is configured to send a heater input signal to the at least one heater device, and wherein the controller is configured to receive the periodic signal output and correlate the periodic signal output to the heater input signal to determine contact between the read/write head and the storage medium.

10. The digital storage system of claim 1, further comprising control circuitry operable to convert the periodic signal output into an estimate of fly height of the read/write head above the storage medium.

11. The digital storage system of claim 10, wherein the control circuitry is configured to adjust a distance between the read/write head and the storage medium in response to the estimate of fly height.

12. The digital storage system of claim 1, wherein the digital storage system is a hard disk drive and the storage medium is a disk operable to rotate during read/write operations.

13. A method of detecting a capacitance of a capacitor formed between a read/write head and a storage medium, wherein the method comprises:

providing a capacitor formed between the read/write head and the storage medium, wherein the capacitor is electrically coupled to a comparator-based, relaxation oscillator circuit; and applying a voltage to the comparator-based, relaxation oscillator circuit to produce a periodic signal output that correlates to a capacitance of the capacitor.

14. The method of claim 13, wherein the capacitor is formed between at least a first metallic feature in the storage medium and at least a second metallic feature in the read/write head.

15. The method of claim 14, wherein the first metallic feature is a magnetic recording layer in the storage medium, and wherein the second metallic feature is chosen from a return pole of a writer, a reader shield, a contact pad, and combinations thereof.

16. The method of claim 13, wherein the periodic signal output is used to determine contact between the read/write head and the storage medium.

17. The method of claim 13, wherein the periodic signal output is used to determine distance between the read/write head and the storage medium.

18. The method of claim 13, wherein the periodic signal output is used to control distance between the read/write head and the storage medium.

19. The method of claim 13, wherein the periodic signal output of the comparator-based, relaxation oscillator circuit has a period from 10 nanoseconds to 10 microseconds.

20. The method of claim 13, wherein the capacitor has a maximum voltage in the range from 100 milliVolts to 1 Volt.

* * * * *